United States Patent
Lylykangas et al.

(10) Patent No.: US 10,369,491 B2
(45) Date of Patent: Aug. 6, 2019

(54) METHOD FOR RECOVERING TRANSITION METAL TETRAHALIDE AND HYDROCARBONS FROM A WASTE STREAM

(75) Inventors: Mikko Lylykangas, Vantaa (FI); Jukka Räsänen, Tolkkinen (FI); Klaus Nyfors, Porvoo (FI); Pekka Malinen, Masala (FI)

(73) Assignee: Borealis AG, Vienna (AT)

( * ) Notice: Subject to any disclaimer, the term of this patent is extended or adjusted under 35 U.S.C. 154(b) by 1201 days.

(21) Appl. No.: 13/884,623

(22) PCT Filed: Nov. 11, 2011

(86) PCT No.: PCT/EP2011/069903
§ 371 (c)(1),
(2), (4) Date: Jul. 10, 2013

(87) PCT Pub. No.: WO2012/062892
PCT Pub. Date: May 18, 2012

(65) Prior Publication Data
US 2014/0042010 A1    Feb. 13, 2014

(30) Foreign Application Priority Data
Nov. 12, 2010   (EP) .................................... 10191041

(51) Int. Cl.
*B01D 1/22*   (2006.01)
*G01G 23/02*  (2006.01)
(Continued)

(52) U.S. Cl.
CPC .............. *B01D 1/22* (2013.01); *B01D 1/222* (2013.01); *C01G 1/06* (2013.01); *C01G 23/022* (2013.01);
(Continued)

(58) Field of Classification Search
CPC ...... C01G 23/024; C01G 23/022; B01D 1/22; B01D 1/222; B01D 1/228; B01D 3/28;
(Continued)

(56) References Cited

U.S. PATENT DOCUMENTS 3,156,630 A   11/1964   Fahnoe et al.
4,107,414 A   8/1978    Giannini et al.
(Continued)

FOREIGN PATENT DOCUMENTS

EP   0045975 A2   2/1982
EP   0045976 A2   2/1982
(Continued)

OTHER PUBLICATIONS

Glover, Wiliam B., "Selecting Evaporators for Process Applications", AIChE, Chemical Engineering Progress, Dec. 2004, pp. 26-33. Available online at: https://lcicorp.com/assets/documents/CE_Evap_Selection.pdf.*

(Continued)

*Primary Examiner* — Jonathan Miller
*Assistant Examiner* — Jonathan Luke Pilcher
(74) *Attorney, Agent, or Firm* — Meunier Carlin & Curfman LLC

(57) ABSTRACT

The present invention provides a process for recovering transition metal tetrahalides from a waste stream coming from a catalyst manufacturing process by (a) establishing a mixed stream comprising transition metal tetrahalide and transition metal alkoxyhalides; (b) forming a falling liquid film from the mixed stream of step (a) at a temperature of from 25 to 85° C. and an absolute pressure of from 0.05 to 0.6 bar; and (c) establishing from the film of step (b) a first vapor stream containing from 90 to 100% of recoverable components and a second liquid stream containing about 10 to 80% of titanium haloalkoxides.

8 Claims, 1 Drawing Sheet

(51) Int. Cl.
*B01D 3/14* (2006.01)
*B01D 3/28* (2006.01)
*C01G 23/02* (2006.01)
*C01G 1/06* (2006.01)
*C22B 34/12* (2006.01)

(52) U.S. Cl.
CPC ........ *C01G 23/024* (2013.01); *C22B 34/1231* (2013.01); *B01D 3/14* (2013.01); *B01D 3/28* (2013.01); *C01P 2006/80* (2013.01); *Y02P 10/23* (2015.11)

(58) Field of Classification Search
CPC . B01D 3/14; B01D 3/148; B01D 3/26; B01D 1/221; B01D 1/223; B01D 1/225; B01D 1/226; B01D 1/227; C22B 34/1231
USPC ........................................................ 159/6.2
See application file for complete search history.

(56) References Cited

U.S. PATENT DOCUMENTS

| | | | |
|---|---|---|---|
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Hoff et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,242,549 A * | 9/1993 | Potter | C08F 4/64 203/6 |
| 5,539,067 A | 7/1996 | Parodi et al. | |
| 5,618,771 A | 4/1997 | Parodi et al. | |
| 5,948,212 A * | 9/1999 | Kilty | B01D 3/146 203/29 |
| 6,358,372 B1 * | 3/2002 | Zum Mallen | B01J 31/0212 203/6 |
| 7,976,818 B2 * | 7/2011 | Vincenzi | B01D 1/223 203/29 |
| 2008/0069761 A1 * | 3/2008 | Vincenzi | B01D 1/223 423/492 |

FOREIGN PATENT DOCUMENTS

| | | |
|---|---|---|
| EP | 0045977 A2 | 2/1982 |
| EP | 0491566 A2 | 6/1992 |
| EP | 0586390 B1 | 5/1997 |
| EP | 0810235 A2 | 12/1997 |
| EP | 0591224 B1 | 2/1998 |
| EP | 0837075 A1 | 4/1998 |
| WO | 87/07620 A | 12/1987 |
| WO | 92/19653 A1 | 11/1992 |
| WO | 92/19658 A1 | 11/1992 |
| WO | 92/19659 A1 | 11/1992 |
| WO | 92/21705 A1 | 12/1992 |
| WO | 93/11165 A1 | 6/1993 |
| WO | 93/11166 A1 | 6/1993 |
| WO | 93/19100 A1 | 9/1993 |
| WO | 95/32994 A1 | 12/1995 |
| WO | 97/36939 A1 | 10/1997 |
| WO | 98/12234 A1 | 3/1998 |
| WO | 99/33842 A1 | 7/1999 |
| WO | 03/000754 A1 | 1/2003 |
| WO | 03/000755 A1 | 1/2003 |
| WO | 03/000756 A1 | 1/2003 |
| WO | 03/000757 A1 | 1/2003 |
| WO | 03/074425 A1 | 9/2003 |
| WO | 03/106510 A1 | 12/2003 |
| WO | 2004/029112 A1 | 4/2004 |
| WO | 2005/118655 A1 | 12/2005 |
| WO | 2006/056562 A1 | 6/2006 |

OTHER PUBLICATIONS

The Pillars Curriculum for Chemical Engineering ("Multi-stage Column Distillation" and "Balances around distillation stages/column"), Jun. 12, 2010 (obtained from wayback machine), available online at: https://web.archive.org/web/20100712155125/http://pillars.che.pitt.edu/student/slide.cgi?course_id=12&slide_id=82.0.*

International Search Report and Written Opinion for Application No. PCT/EP2011/069903 dated Feb. 24, 2012.

* cited by examiner

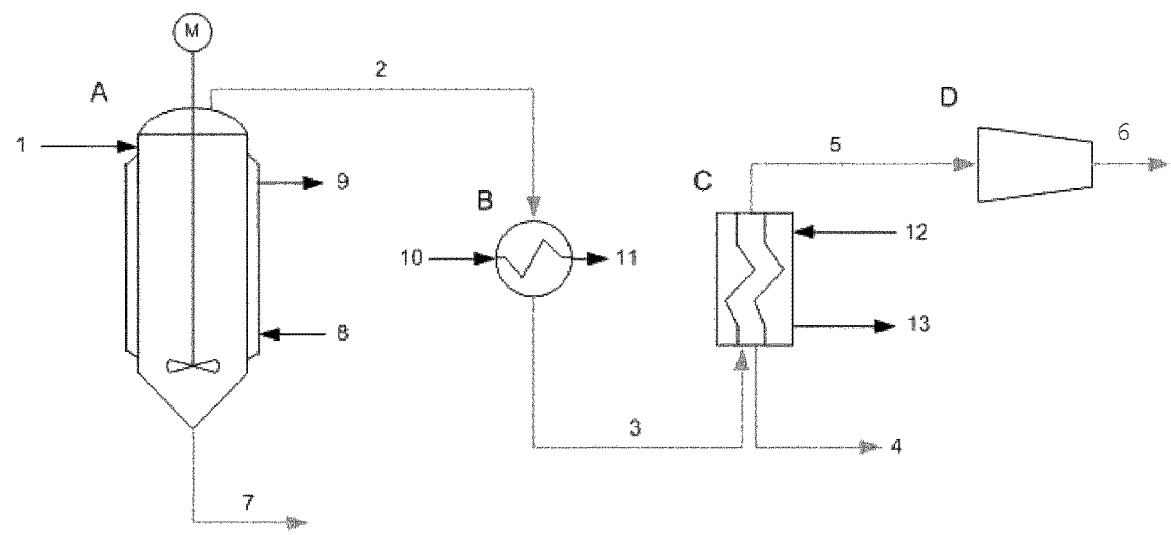

METHOD FOR RECOVERING TRANSITION METAL TETRAHALIDE AND HYDROCARBONS FROM A WASTE STREAM

OBJECTIVE OF THE INVENTION

The present invention is related to the recovery of recoverable components from an effluent stream from catalyst manufacturing process.

More specifically, the present invention is directed to the recovery of hydrocarbon materials and transition metal tetrahalide from a wash effluent collected from a process for producing an olefin polymerization catalyst.

The present process is directed to the recovery and purification of hydrocarbon materials and transition metal tetrahalide in such purity that they can be reused in the process for producing an olefin polymerization catalyst.

TECHNICAL FIELD

It is known to use a thin film evaporator for recovering light components from a viscous liquid. The document WO-A-2006056562 discloses that such evaporators can be used in treating effluents form olefin polymerization catalyst production at a temperature of more than 90° C. and a residence time of less than 15 minutes. Preferably the evaporation step was preceded by a distillation step.

SUMMARY OF THE INVENTION

The Problem Solved by the Present Invention

While the process proposed in WO-A-2006056562 may work well for certain type of effluents the present inventors have found that especially for effluent liquids containing hydrocarbons, titanium tetrachloride and titanium haloalkoxides it leads to a highly viscous residue at relatively high ratios of residue to distillate. Furthermore, at the high temperatures the residue may form tarry lumps which may remain in the evaporator and disturb the process.

After thorough investigations the inventors found that by conducting the evaporation at a reduced pressure and at a lower temperature the formation of lumps may be avoided and a residue of a lower viscosity is obtained.

SHORT DESCRIPTION OF THE INVENTION

The present invention provides a process for recovering titanium tetrachloride from a process stream comprising the steps of:
(a) Establishing a mixed stream comprising titanium tetrachloride and titanium alkoxy chlorides;
(b) Forming a falling liquid film from the stream of step (a) at a temperature of from 25 to 85° C. and an absolute pressure of from 0.05 to 0.6 bar;
(c) Establishing from the film of step (b) a first stream containing from 90 to 100% of recoverable components and a second stream containing about 10 to 80% of titanium haloalkoxides.

DESCRIPTION OF THE FIGURE

FIG. 1 shows a schematic drawing of a typical evaporator.

DETAILED DESCRIPTION

Definitions

Unless otherwise specified all percentage figures in this application refer to weight basis. Thus, a FIGURE of 70% refers to 70% by weight.

The present text refers to recoverable components. They are certain liquid components which are used in the catalyst preparation process either as reactants or as solvents. By recoverable components it is here meant a group of compounds consisting of transition metal tetrahalides, aliphatic hydrocarbons, which preferably have from 5 to 12 carbon atoms, aromatic hydrocarbons, which preferably have from 5 to 12 carbon atoms, and mixtures thereof. Thus, in one embodiment the recoverable components may consist of titanium tetrachloride. In another embodiment the recoverable components may consist of toluene and titanium tetrachloride. In a further embodiment the recoverable components may consist of toluene, heptane and titanium tetrachloride.

The terms transition metal haloalkoxide and transition metal alkoxyhalide are used interchangeably in the text to denote compounds having at least one alkoxy and at least one halide group attached to a transition metal atom. They are formed, for instance, when a transition metal halide, such as titanium tetrachloride, reacts with an alcohol, such as 2-ethylhexanol, or an ester, such as di-2-ethylexylphthalate. Typically the haloalkoxides discussed in this text are compounds containing one alkoxy group and three halide groups, such as titaniumtrichloro-2-ethylhexanolate.

Catalyst Manufacturing

The present recovery process can be used in the production of a big number of catalysts. The method is especially suitable for recovering one or more components used in the production of polymerization catalysts of Ziegler-Natta type. Such catalysts may be used to polymerize ethylene, propylene and other α-olefins having from 4 to 12 carbon atoms, or their mixtures. Such catalysts are disclosed, among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. Nos. 4,382,019, 4,435,550, 4,465,782, 4,473,660, 4,560,671, 5,539,067, 5,618,771, EP-A-45975, EP-A-45976, EP-A-45977, WO-A-95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882. Such catalysts typically comprise a solid transition metal component and a cocatalyst.

According to one preferred embodiment the present invention is used in the manufacture of catalysts where the solid transition metal component comprises a magnesium halide and a transition metal compound. These compounds may be supported on a particulate support, such as inorganic oxide, like silica or alumina, or, usually, the magnesium halide itself may form the solid support. Examples of such catalysts are disclosed, among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-2005/118655, EP-A-810235 and WO-A-2004/029112.

In a further embodiment the solid transition metal component usually also comprises an electron donor (internal electron donor) in addition to the magnesium halide and transition metal compound. Suitable electron donors are, among others, esters of carboxylic acids, like phthalates, citraconates, and succinates. Also oxygen- or nitrogen-containing silicon compounds may be used. Examples of suitable compounds are shown in WO-A-92/19659, WO-A-92/19653, WO-A-92/19658, U.S. Pat. Nos. 4,347,160, 4,382,019, 4,435,550, 4,465,782, 4,473,660, 4,530,912 and 4,560,671.

Thus, in one preferred embodiment activated magnesium dichloride is suspended under inert conditions in an aliphatic hydrocarbon in a reactor at atmospheric pressure. The solution is cooled to the temperature of −15° C. and cold titanium tetrachloride is added while maintaining the temperature at said level. Then, the temperature of the slurry is increased slowly to 20° C. At this temperature di(ethylhexyl) phthalate (DOP) is added to the slurry. After the addition of the phthalate, the temperature is raised to 135° C. and the slurry is allowed to stand for a certain period of time. Thereafter the catalyst is filtered from the liquid. Then, another portion of titanium tetrachloride is added and the temperature is kept at 135° C. After this, the catalyst is filtered from the liquid and washed with heptane at 80° C. Then, the solid catalyst component is filtered and dried. Such methods are disclosed, among others, in EP-A-491566, EP-A-591224 and EP-A-586390.

According to another preferred embodiment the catalyst components are prepared according to WO-A-2004/029112 or WO-A-2003/106510. According to this embodiment the solid catalyst component is prepared by a process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one fourvalent Group 4 metal to produce an emulsion of a $TiCl_4$/toluene-insoluble oil dispersed phase having, Group 4 metal/Mg mol ratio 0.1 to 10 in an oil disperse phase having Group 4 metal/Mg mol ratio 10 to 100; and agitating the emulsion, optionally in the presence of an emulsion stabilizer and/or a turbulence minimizing agent. The catalyst particles are obtained after solidifying said particles of the dispersed phase.

Mixed Stream

Typically, the solid catalyst component is subjected to one or more decanting and washing steps.

In the decanting step the catalyst slurry is concentrated by decanting an excess of the liquid phase. The amount of the liquid that is decanted depends, among others, the initial concentration of the catalyst in the slurry. Typically from 20 to 85% of the liquid may be removed from the catalyst. The decanted liquid portion may, in addition to the liquid phase, contain a minute amount of catalyst. However, the amount of catalyst in the decanted liquid is preferably less than 5% by weight, more preferably less than 2% by weight and in particular less than 1% by weight. The decanted liquid contains reactants used in the catalyst preparation process and their soluble reaction products. Usually the liquid contains at least a transition metal tetrahalide, preferably a tetrahalide of a group 4 or Group 5 transition metal.

In the washing step the solid catalyst component is contacted with a wash liquid. Then excess of the liquid phase is removed, typically by decanting, and concentrated catalyst slurry is formed. To this concentrated slurry another portion of the wash liquid may be added and the procedure may be repeated a suitable number of times.

The wash liquid used in a subsequent washing step, if present, may be the same as or different from the wash liquid used in a prior washing step. Suitably the wash liquid is selected from the group consisting of transition metal tetrahalides, aliphatic hydrocarbons and aromatic hydrocarbons.

Examples of transition metal tetrahalides are the tetrahalides of group 4 or group 5 transition metals, such as titanium tetrahalides, zirconium tetrahalides and vanadium tetrahalides. Especially preferably the transition metal tetrahalide is a transition metal tetrachloride, such as a tetrachloride of transition metal of group 4 or group 5, for example titanium tetrachloride, zirconium tetrachloride or vanadium tetrachloride and in particular titanium tetrachloride.

By aliphatic hydrocarbons is here meant a straight-chained, branched or cyclic hydrocarbon compound which is not aromatic and which is liquid in washing conditions. Preferred aliphatic hydrocarbons are alkanes or cycloalkanes having from 5 to 12 carbon atoms. Examples of useful aliphatic hydrocarbons are n-pentane, isopentane, n-hexane, 2-methylpentane, 3-methylpentane, cyclohexane, n-heptane, 2-methylhexane, 3-methylhexane, 3-ethylpentane, n-octane, 2-methylheptane, 3-methylheptane, 4-methylheptane and 3-ethylhexane.

By aromatic hydrocarbon is here meant a hydrocarbon compound which is liquid in washing conditions and which contains an aromatic group, such as a benzene ring or a cyclopentadienyl ring. The aromatic group may contain hydrocarbon substituents. Preferred aromatic hydrocarbons are substituted or unsubstituted aromatic hydrocarbon compounds having from 5 to 12 carbon atoms. Examples of useful aromatic hydrocarbons are benzene, toluene, 1,2-dimethylbenzene, 1,3-dimethylbenzene, 1,4-dimethylbenzene, ethylbenzene, 1,2-diethylbenzene, 1,3-diethylbenzene and 1,4-diethylbenzene.

Also mixtures of the compounds defined above may be used as the wash liquid.

The effluent from the washing step contains the wash liquid together with transition metal haloalkoxides, typically titanium haloalkoxides such as titanium chloroalkoxides. It additionally may contain unreacted donor, unreacted transition metal halide, traces of magnesium halide and other compounds used in catalyst preparation.

The effluent from one or more decanting steps or one or more washing steps or one or more combined decanting and washing steps forms a mixed stream. Alternatively, the effluents from two or more washing steps may be combined to form a mixed stream. The mixed stream contains recoverable components, such as the wash liquid and the transition metal tetrahalide, which may be used in the catalyst manufacturing process. On the other hand, it also contains transition metal haloakoxides which cannot be reused but must be disposed of.

The mixed stream may be subjected to preliminary mechanical separation processes, such as filtering, before subjecting the stream to an evaporation process.

Falling Liquid Film

The recoverable compounds are separated from the disposable components by using a falling film evaporation process. In such a process a falling film is formed from the stream at a temperature and pressure where a part of the components contained in the stream vaporize. The vapour fraction is collected, condensed and reused while the residue is disposed of.

The falling liquid film is produced in an evaporator, such as a thin film evaporator. It typically consists of a vertical heated body and rotating blades. The feed which may be preheated enters the evaporator at the top. The feed is passed through a distributor ring, mounted on the rotor, which distributes the feed evenly on the internal wall of the evaporator. The falling liquid film is kept in circular motion in turbulent flow conditions with rotating blades. The thin film and the turbulent conditions in combination create fast heat and mass transfer. This allows rapid heating of the film and vaporization of the light components. Clean vapours are collected from the top of the evaporator while the residue is withdrawn from the bottom.

The thickness and the flow of the film are controlled with the internal rotating blades. Different blades, also sometimes referred to as wiper systems, are well known in the art. Typically the film has a thickness of less than 20 mm, preferably at most 10 mm and in particular at most 5 mm.

Typically the vapours are cooled and condensed after they have been collected. Typically the vapour is withdrawn from the evaporator from the top and then condensed but in smaller evaporators the condenser may reside within the evaporator. In such a case the condensed distillate is withdrawn from the bottom. Such evaporators are also known as short path evaporators.

Evaporators are well known in the art and they are available, among others, from Niro, Columbia Energy, Pfaudler, Buss-SMS-Canzler GmbH, GIG Karasek and InCon. An overview is given, for instance, in Kirk-Othmer, Encyclopedia of Chemical Technology, $2^{nd}$ edition (1965), Volume 8, pages 569-570 as well as Coulson and Richardson's Chemical Engineering, Volume 2, Fifth Edition, Particle Technology and Separation Processes, Butterworth Heinemann (2002) paragraph 14.7.6 on pages 814-816.

In the equipment according to FIG. 1 the effluent stream of decantation and washing steps enters the evaporator A as the feed stream 1. The evaporator has rotating blades mounted to a shaft driven by the motor M. The temperature within the evaporator A is controlled by means of a heating jacket into which hot oil enters via line 8 and exits via line 9. The feed forms a thin film which falls downwards along the wall of the evaporator A. When the feed stream travels downwards the volatile components are vaporized and collected as a distillate via line 2. The high-boiling residue remains in liquid form and is withdrawn as a bottom stream 7.

After leaving the evaporator A the vapour distillate stream 2 is condensed in a cooler B, into which coolant is introduced via line 10 and withdrawn via line 11. The condensate stream 3 is withdrawn from the cooler B and directed to a cold trap C from where the condensed product is collected as stream 4. From the cold trap C leads a vacuum line 5 to the vacuum pump D from where inert gas is withdrawn via line 6. The cold trap C is cooled by cooling oil entering via line 12 and exiting via line 13.

First Stream

The first stream is the vapour stream evaporated from the falling film. This vapour stream is then collected and condensed in a cooler. The first stream contains the recoverable components of the mixed stream.

According to one preferred embodiment the first stream consists essentially of transition metal tetrahalide, preferably group 4 or group 5 transition metal tetrahalide, in particular titanium tetrahalide, zirconium tetrahalide or vanadium tetrahalide. Especially preferably it is a transition metal tetrachloride, such as titanium tetrachloride, zirconium tetrachloride or vanadium tetrachloride and in particular titanium tetrachloride. According to this embodiment the first stream contains from 90 to 100%, preferably from 95 to 100% and in particular from 99 to 100%, such as 99.5%, transition metal tetrahalide.

According to another preferred embodiment the first stream contains the above-mentioned transition metal tetrahalide and additionally a hydrocarbon or a mixture of hydrocarbons. The hydrocarbon is the same as the wash liquid discussed above. In this embodiment the first stream contains from 5 to 70% by weight of the transition metal tetrahalide and from 30 to 95% by weight of the hydrocarbon or the mixture of hydrocarbons.

Typically from about 50 to 95% of the recoverable components are recovered in the first stream while the rest goes into the second stream. While it would be economically advantageous to recover as much of the recoverable components as possible, there are practical limits in that the second stream must be processable.

As the person skilled in the art understands also some transition metal alkoxyhalide may be present in the first stream. The amount of such alkoxyhalides is preferably less than 2% by weight and more preferably less than 1% by weight of the first stream.

Further Treatment of the First Stream

Where the first stream contains more than one recoverable component, for instance a transition metal halide and an aromatic hydrocarbon, then it is preferred to further separate the components so that each component may be individually recycled into the catalyst manufacturing process. The separation of the components may be achieved by well-known separation techniques, such as flashing, distillation, stripping and the like.

Preferably the components are separated by distillation. In the distillation process the hydrocarbon is typically recovered as the distillate and the transition metal tetrahalide as the bottom product. Typically then the distillate stream contains from 80 to 100% by weight of the hydrocarbon or the mixture of hydrocarbons, preferably form 90 to 100% by weight and more preferably from 95 to 100% by weight. The bottom stream contains from 80 to 100% by weight of transition metal tetrahalide, preferably from 90 to 100% and more preferably from 95 to 100%. In one particular embodiment the distillate stream contains from 99 to 100% by weight of toluene and the bottom stream from 99 to 100% by weight of titanium tetrachloride.

Second Stream

The second stream contains the residue from the evaporator. It mainly contains transition metal haloalkoxides. It also contains some transition metal tetrahalide, but also minute amounts of solid or high-boiling components used in the catalyst manufacturing process, such as magnesium dichloride, electron donor and the like. While it would be advantageous to remove all transition metal tetrahalide from the second stream this would result in the second stream becoming too viscous to be handled. Therefore some transition metal tetrahalide necessarily remains in the second stream. Also some residual hydrocarbon may be present in the second stream.

As an example the second stream contains from 10 to 40% by weight of the transition metal tetrahalide, from 10 to 80% by weight of the transition metal haloalkoxides, from 10 to 40% by weight of electron donor and magnesium dichloride and up to 10% by weight of hydrocarbons.

Typically the second stream and its components cannot be recovered and reused. Instead, the second stream is a waste stream and is disposed of. It contains environmentally hazardous components. It is thus considered as problem waste and must be treated accordingly.

ADVANTAGES OF THE INVENTION

The present invention provides a simple and economical process of recovering and recycling components used in manufacturing olefin polymerization catalysts. The process is reliable in operation and the components can be recovered in high yield.

EXAMPLES

Methods
Content of Titanium and Magnesium

The elemental analysis of catalyst waste streams were performed by taking a liquid sample of mass, M, under inert conditions. The sample was then treated with iso-propanol, stirred and then acidified with dilute nitric acid whilst stirring. The sample vial was then opened and transferred to Pt dish, the vial rinsed with additional iso-propanol and dilute nitric acid. The Pt dish transferred to a warm sand bath (~80° C.) and evaporated overnight. The sample residues were diluted up to a known volume, V, by dissolving in nitric acid ($HNO_3$, 65%, 5% of V), hydrofluoric acid (HF, 40%, 3% of V) and freshly deionised (DI) water (5% of V). The solution was then transferred to a polypropylene volumetric flask and, the Pt dish rinsed and the sample diluted with DI water up to the final volume, V, and left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$, 3% HF in DI water), and standards of 0.5 ppm, 1 ppm, 10 ppm, 50 ppm, 100 ppm and 300 ppm of Al, Mg and Ti in solutions of 5% $HNO_3$, 3% HF in DI water.

Immediately before analysis the calibration is 'resloped' using the blank and 100 ppm standard, a quality control sample (20 ppm Al, Mg and Ti in a solution of 5% $HNO_3$, 3% HF in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Content of $TiCl_4$

It was assumed that all titanium was present as $TiCl_4$ and haloalkoxide of the type $TiCl_3OEHA$. In calculations the concentration of these components was based on the amount of Ti (by ICP-AES) and 2-ethylhexanol (sample hydrolysis and consequent GC analysis) from which the molar amount of titanium tetrachloride was calculated by:

$$n_{TiCl4} = n_{Ti,total} - n_{Ti,TiCl3OEHA} \text{ [mol]} \quad (1)$$

where $n_{Ti, TiCl3OEHA} = n_{EHA}$ [mol].

Content of Hydrocarbons

The determination of the quantity of hydrocarbons in the sample was performed using GC (He carrier gas, Fl-detector, DB-1 column, 30 m×0.32 mm, film thickness 0.25 μm).

50-100 mg of the sample was weighed in a 20 ml vial (accuracy of weighing 0.1 mg). 3-4 ml dichloromethane was added, this was followed by a known mass of nonane as the internal standard. The sample is sonicated for 5-10 min in an ultrasound bath. The sample was diluted appropriately and a liquid sample was filtered using 0.45 μm filter to the sample vial of the GC instrument.

The heating phase involves holding at 40° C. for 5 min, ramping at 10° C./min up to 250° C. where the temperature is held for a further 4 min.

For 2-ethylhexanol analysis approximately 1 ml water was added to the solution before sonication. When transferring the sample to the GC vial a sample was removed from the organic phase only.

The content of the component x, $C_x$, in the sample was then calculated from:

$$C_x \text{ (in wt-\%)} = A_x \cdot F \cdot M_i / (A_y \cdot F_{istd} \cdot M_{sample}) \cdot 100$$

Where $A_x$ is the peak area of component x, F is the factor of component x, $M_i$ is the weight of the internal standard (nonane) in mg, $A_y$ is the peak area of the internal standard, $F_{istd}$ is the factor of the internal standard and $M_{sample}$ is the weight of the sample in mg.

The results are usually calculated automatically by the computer controlling the GC apparatus. The detection limit for hydrocarbons is 0.01% by weight and for 2-ethylhexanol 0.1% by weight.

Content of Titanium Alkoxyhalides

It was assumed that all titanium was present as $TiCl_4$ and haloalkoxide of the type $TiCl_3OEHA$. In calculations the concentration of these components was based on the amount of Ti (by ICP-AES) and 2-ethylhexanol (sample hydrolysis and consequent GC analysis). The amount of 2-ethylhexanol is then taken as the amount of Ti-alkoxyhalide, i.e., $n_{Ti, TiCl3OEHA} = n_{EHA}$ [mol].

Content of $MgCl_2$

The content of $MgCl_2$ in the liquid mixture was determined from the Mg-analysis as described above by assuming that all Mg is in the form of $MgCl_2$.

Content of di-2-ethylhexylphthalate

The content of di-2-ethylhexylphthalate in the liquid phase was measured using HPLC (UV-detector, RP-8 column, 250 mm×4 mm). Pure di-2-ethylhexylphthalate was used to prepare standard solutions.

50-100 mg of the sample was weighed in a 20 ml vial (accuracy of weighing 0.1 mg). 10 ml acetonitrile was added and the sample suspension was treated for 5-10 min in an ultrasound bath. The acetonitrile suspension was diluted appropriately and a liquid sample was filtered using 0.45 μm filter to the sample vial of HPLC instrument. Peak heights were obtained from HPLC.

The percentage of donor in the sample was calculated using the following equation:

$$\text{Percentage (\%)} = A_1 \cdot c \cdot V \cdot A_2^{-1} \cdot m^{-1} \cdot 0.1\%$$

where
$A_1$=height of the sample peak
c=concentration of the standard solution (mg/l)
V=volume of the sample solution (ml)
$A_2$=height of the standard peak
m=weight of the sample (mg)

Example 1

Solid Ziegler-Natta catalyst components were subjected to a washing stage with toluene. The washing stage consisted of one decanting step and one washing step. In the decanting step a part of the liquid phase was removed from the catalyst so that about 20% of the liquid remained with the catalyst. Then, a volume of toluene corresponding to the removed liquid volume was added to the catalyst. Then the liquid was removed in the same way as in the decantation step described above.

The liquid phase was recovered and analyzed. It was found to contain 58% by weight of toluene, 26% by weight of $TiCl_4$, 6% of heptane, 8% of titanium haloalkoxides, 1.5% of a di-2-ethylhexylphthalate and 0.5% of $MgCl_2$. This is referred to as liquid A.

Example 2

The procedure of Example 1 was repeated except that a different catalyst preparation method was used. The recovered liquid phase was found to contain 65% by weight of toluene, 20% by weight of $TiCl_4$, 6% of heptane, 7% of titanium haloalkoxides, 1.5% of a di-2-ethylhexylphthalate and 0.5% of $MgCl_2$. This is referred to as liquid B.

Example 3

The procedure of Example 1 was repeated except that a different catalyst preparation method was used. The recovered liquid phase was found to contain 64% by weight of toluene, 22% by weight of $TiCl_4$, 4% of heptane, 6% of titanium haloalkoxides, 2.5% of a di-2-ethylhexylphthalate and 1.5% of $MgCl_2$. This is referred to as liquid C.

Examples 4 and 5 below were conducted to demonstrate the maximum recovery of the distillate.

Example 4

The liquid C (of Example 3) was transferred to a thin film evaporator provided by GIG Karasek GmbH having a diameter of 70 mm and a length of 190 mm. The evaporator has a cylindrical body which is wiped by rotary blades. It has a heated surface of 4 $dm^2$ and three anti-splashing blades. The evaporator was operated under argon atmosphere.

A falling film of liquid C was formed in the evaporator at an absolute pressure of 220 mbar (0.2 bar). The temperature of the oil heating the walls of the evaporator was 60° C. The rotation speed of the wiper blades was 392 revolutions per minute. The feed rate of the liquid C was 4 g/min. In total 109.4 grams of liquid C was treated as described above. The thickness of the film was less than 1 mm.

Consequently, 99 grams of the distillate fraction and 10.4 grams of the residue were recovered. The residue was viscous and slowly flowable in the test conditions, probably due to a very high distillate to residue ratio. However, no fouling of the equipment was detected. Data and results are shown in Table 1.

The distillate fraction was analyzed and found to contain 73% toluene, 22% $TiCl_4$ and 5% heptane. Also the residue was analyzed and found to contain 19% $TiCl_4$, 43% $TiCl_3C_8H_{16}OH$, 13% $C_{24}H_{38}O_4$, 1% $C_7H_{16}$ and 6% $MgCl_2$.

Example 5

The procedure of Example 4 was repeated except that the pressure was 450 mbar, the temperature of the oil was 80° C. and the feed rate 2.5 g/min. The residue was flowable in the test conditions and no fouling of the equipment was detected. Other data and results are shown in Table 1.

Examples 6 and 7 were conducted to demonstrate the maximum throughput.

Example 6

The procedure of Example 4 was repeated except that the liquid B was used in place of the liquid C and that the temperature of the oil was 70° C., pressure was 240 mbar and the feed rate was 7 g/min. The residue was flowable in the test conditions and no fouling of the equipment was detected. Other data and results are shown in Table 1.

Example 7

The procedure of Example 6 was repeated except that the temperature of the oil was 80° C., the pressure 250 mbar and the feed rate 8 g/min. The residue was flowable in the test conditions and no fouling of the equipment was detected. Other data and results are shown in Table 1.

Comparative Example 8

The procedure of Example 4 was repeated except that liquid A was used in place of the liquid C. Furthermore, the temperature of the oil was 110° C., the test was conducted at atmospheric pressure (1.0 bar) and the feed rate was 6 g/min.

The residue became extremely viscous and hardly flowable even though the residue to distillate ratio was somewhat higher than in Example 4. Additionally, lumps were formed at the bottom of the evaporator and these could not be removed during the run. Additional data and results are shown in Table 1.

Example 9

The distillate fraction of Example 4 was analyzed and found to contain 73% toluene, 22% $TiCl_4$ and 5% heptane. It was directed to a distillation step at 1 bar absolute pressure wherein the thus obtained distillate contained 1% of $TiCl_4$, 93% toluene and 6% heptane. The bottom product contained 99.5% $TiCl_4$ and 0.5% toluene. The temperature at the bottom of the column was 136° C.

TABLE 1

| | | Data of evaporation experiments | | | | | | |
|---|---|---|---|---|---|---|---|---|
| Example | Material | Temperature, ° C. | Pressure, mbar | Wiper RPM | Feed, g/min | Residue, grams | Distillate, grams | R/D, |
| 4 | C | 60 | 220 | 392 | 4 | 10.4 | 99.0 | 0.11 |
| 5 | C | 80 | 450 | 335 | 2.5 | 34.9 | 187.5 | 0.19 |
| 6 | B | 70 | 240 | 340 | 7 | 26.6 | 79.8 | 0.33 |
| 7 | B | 80 | 250 | 345 | 8 | 43.9 | 143.3 | 0.31 |
| 8 | A | 110 | 1000 | 406 | 6 | 12.5[1)] | 80.4 | 0.16 |

Notes:
[1)]Lumps were formed in the evaporator and the mass of the lumps is not included in the figure. Therefore, the true mass of the residue was greater than what was measured.

The invention claimed is:

1. A process for recovering TiCl$_4$ from a process stream comprising the steps of:
   (a) establishing a mixed stream comprising TiCl$_4$ and a transition metal haloalkoxide by
      (a-1) contacting a solid olefin polymerization catalyst component with a wash liquid thereby producing a mixture comprising the solid catalyst component and a liquid component,
         wherein the wash liquid is selected from a group consisting of n-pentane, isopentane, n-hexane, 2-methylpentane, 3-methylpentane, cyclohexane, n-heptane, 2-methylhexane, 3-methylhexane, 2-ethylpentane, n-octane, 2-methylheptane, 3-methylheptane, 4-methylheptane, 3-ethylhexane, benzene, toluene, and their mixtures, and
         wherein the liquid component comprises the wash liquid, TiCl$_4$, and the transition metal haloalkoxide;
      (a-2) dividing the mixture of step (a-1) into a product fraction comprising a majority of the solid catalyst component and a liquid fraction comprising the liquid component;
      (a-3) recovering the liquid fraction; and
      (a-4) establishing said mixed stream from said liquid fraction;
   (b) forming a falling liquid film from the mixed stream of step (a) at a temperature of from 50 to 80° C. and an absolute pressure of from 0.1 to 0.6 bar; and
   (c) establishing from the film of step (b):
      an amount of a distillate, the distillate containing from 90 to 100% by weight of recoverable components, the recoverable components comprising TiCl$_4$ and the wash liquid, and
      an amount of a residue, the residue containing about 20 to 80% by weight of the transition metal haloalkoxide,
      wherein the ratio of the amount of residue to the amount of distillate (R/D) is from 0.05 to 0.35.

2. The process according to claim 1, wherein said distillate contains less than 1% by weight of the transition metal haloalkoxide.

3. The process according to claim 1, wherein the transition metal haloalkoxide comprises a group 4 or group 5 transition metal.

4. The process according to claim 3, wherein said group 4 or group 5 transition metal is titanium.

5. The process according to claim 1, wherein the transition metal haloalkoxide is a transition metal chloroalkoxide.

6. The process according to claim 1, wherein the process further comprises the steps of:
   (d) condensing the distillate into a condensate, and directing the condensate into a distillation step;
   (e) withdrawing a first light stream from said distillation step, wherein the first light stream comprises at least 80% by weight of the wash liquid; and
   (f) withdrawing a first bottom stream from said distillation step, wherein the first bottom stream comprises at least 80% by weight of TiCl$_4$.

7. The process according to claim 6, wherein the first light stream contains at least 90% by weight of the wash liquid.

8. The process according to claim 6, wherein the first bottom stream contains at least 95% by weight of TiCl$_4$.

* * * * *